March 12, 1968
A. R. RONZIO
3,373,118
SHIELDING COMPOSITION OF ANHYDROUS NAPHTHENIC AND
2-ETHYL-HEXANOIC ACID SALTS OF
CADMIUM, GADOLINIUM, AND
SAMARIUM IN PARAFFIN
AND METHOD OF
SHIELDING
Filed Sept. 22, 1965
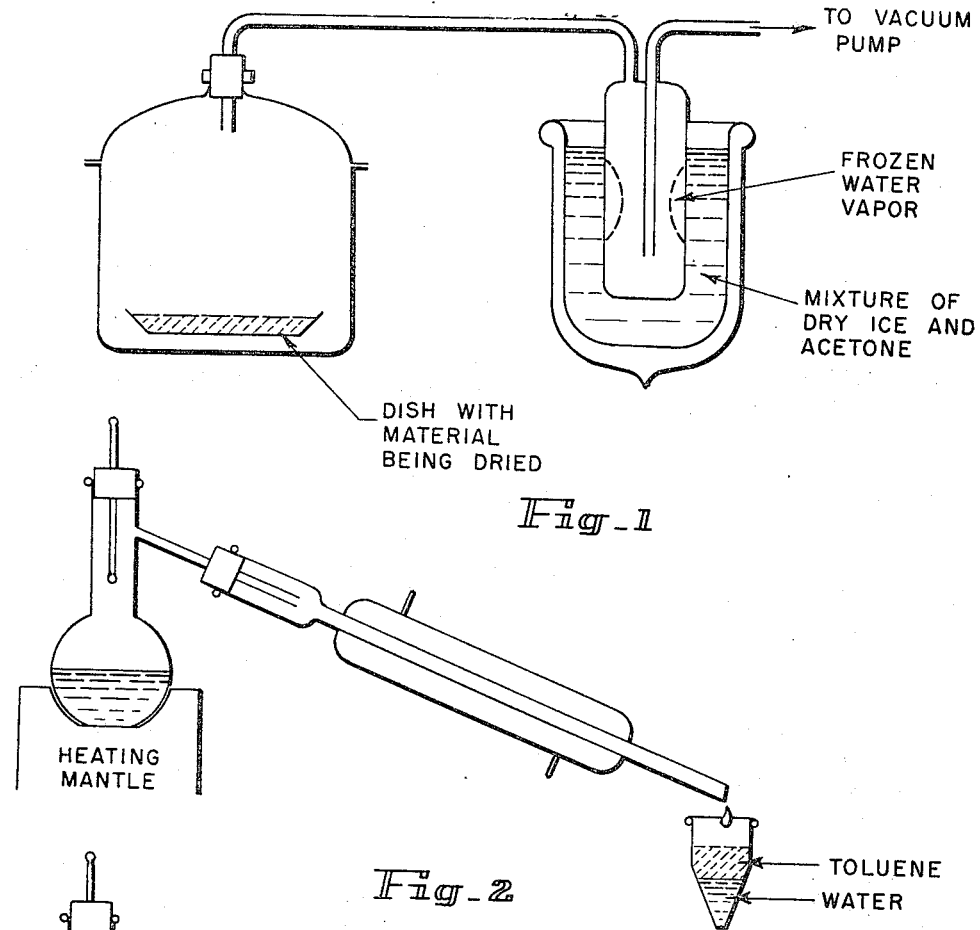
Fig_1
Fig_2
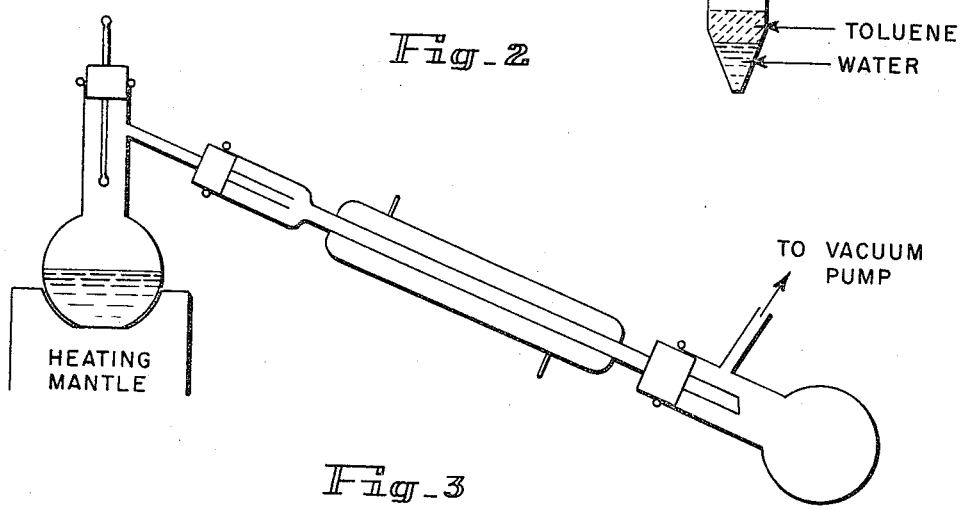
Fig_3
INVENTOR.
ANTHONY R RONZIO
BY
Bertha L. MacGregor
ATTORNEY

United States Patent Office 3,373,118
Patented Mar. 12, 1968

3,373,118
SHIELDING COMPOSITION OF ANHYDROUS NAPHTHENIC AND 2 - ETHYL - HEXANOIC ACID SALTS OF CADMIUM, GADOLINIUM, AND SAMARIUM IN PARAFFIN AND METHOD OF SHIELDING
Anthony R. Ronzio, Littleton, Colo., assignor to Morco Oil Corporation, Denver, Colo., a corporation of Nevada
Filed Sept. 22, 1965, Ser. No. 493,304
4 Claims. (Cl. 252—478)

This invention relates to a composition and method for shielding compenents from neutron irradiation. The components may be electrical, and may be embodied in missiles, analytic equipment, electronic apparatus, transistors, and other devices. The composition is designed for first slowing down a neutron and then capturing it.

One of the objects of the invention is to produce a composition for shielding components from neutron irradiation which is both a neutron moderator and a neutron absorber.

Another object is to produce a composition of the character described which can be molded around delicate instruments such as those used in micro modules, to thereby efficiently protect these components from neutron irradiation.

Another object of the invention is to provide an efficient method of shielding neutron producing equipment and thus prevent release of stray neutron irradiation.

The neutron is a neutral nuclear particle with a mass of 1.00893. It is heavier than the proton (hydrogen ion) with a mass of 1.00758, and much heavier than the electron whose mass is 0.000548. The proton has a positive charge while the electron has a negative charge. It is this lack of charge which makes the neutron unique among nuclear particles, and accounts for its great penetrating power in solids and by its not being deflected in a magnetic field. Since the atom consists of a nucleus with positive charge surrounded by a cloud of electrons whose charge is negative, neither the electron nor the proton can penetrate the atom with ease. The lack of charge on the neutron makes it behave very differently. It can experience force only when it comes within very close range of a nucleus.

This approach of the neutron to the nucleus is regarded as either elastic or inelastic. In an elastic collision a portion of the energy is transferred to the nucleus and both particles will recoil away from each other. If the nucleus of the atom struck is heavy, the neutron will rebound with no loss of energy; when the atom is small, energy is imparted to it and the neutron will rebound with reduced energy. Using an analogy, if a marble strikes a billiard ball, the marble rebounds but the ball will hardly move. When a marble strikes another marble, both will rebound indicating that the struck marble has absorbed considerable energy.

A "fast neutron," one which is moving very fast, can travel great distances with little loss in energy. When a neutron passes through matter having a large quantity of hydrogen, the neutron loses energy to the hydrogen and then becomes a "slow neutron" or a "thermal neutron." When a slow neutron then strikes the nucleus of the atom, the collision is inelastic and the neutron enters the nucleus. It may pass on through or it may remain entrapped within the nucleus. The ability of an atom to entrap a neutron is called the "capture cross-section" and the unit for this ability is the "barn." The atom which captures a neutron becomes an isotope of the parent atom which in turn may be either stable or radioactive.

When a neutron is captured it can cause ordinary stable atoms to become radioactive, or in the cases of elements with a "Z" (atomic number) greater than 90, to actually fission.

Paraffin and water are substances having high hydrogen concentrations. Paraffin has the highest hydrogen concentration of all organic substances ($^{26}\!/_{14}$). Therefore I have chosen paraffin as the substance in which I dissolve a paraffin soluble compound of cadmium, gadolinium or samarium, the three elements which have the highest capture cross section of the elements. The capture cross-section for these elements are 2,500 for cadmium, 46,000 for gadolinium and 5,800 for samarium.

I have found that anhydrous naphthenic and 2-ethylhexanoic acid salts of cadmium, gadolinium and samarium are soluble in molten paraffin. In the molten state, the resultant composition can be poured over or be used to encapsulate the part or component to be protected. I have found that these compositions do not conduct the electric current and can be used for shielding electrical equipment.

In order for the naphthenic and 2-ethylhejanoic acid salts of cadium, gadolinium and samarium to be soluble in paraffin, they must be free of water. When made by the usual methods known to the art, these compounds will contain water of hydration.

In the drawings:

FIG. 1 is a diagrammatic view showing apparatus useful in one method of making naphthenic and 2-ethyl hexanoic acid salts of cadmium, gadolinium and samarium anhydrous.

FIGS. 2 and 3 are diagrammatic views showing apparatus useful in another method of making 2-ethyl-hexanoic acid salts anhydrous.

2-ethyl-hexanoic acid salts of cadmium, gadolinium and samarium are compounds in the form of a thick syrup which is insoluble in water. The compound can be made anhydrous in two ways. One method employs the apparatus shown in FIG. 1, in which the compound is spread in thin layers on dishes, heated to 100–110° C. in an oven, then while still hot the dishes are placed in a closed chamber and high vacuum is then applied. This process is repeated until all moisture is removed. Completeness of the operation is indicated when moisture no long collects in a trap cooled with "Dry Ice."

Another method employs the apparatus shown in FIGS. 2 and 3. The compound is dissolved in hot toluene and the toluene is distilled off in a distillation apparatus. The water co-distills off with the toluene. When the vapors condense, the water and the toluene separate into two layers. The removal of water is complete and the distillation is terminated when the water layer no longer increases in volume, as shown in FIG. 2. The remaining toluene is then removed by distilling under vacuum, as shown in FIG. 3.

By using another method, the gadolinium and samarium 2-ethyl hexanoates may be prepared anhydrous and in crystalline form by suspending the freshly prepared salt in an excess of toluene. The mixture is then placed in the apparatus shown in FIG. 1, and is heated. Upon heating the compound dissolves in the toluene. The toluene and water are distilled off as before. When the removal of water is complete, fresh toluene is added to redissolve any solid which may separate. Then, while the solution is still hot, it is diluted with an equal volume of pure triethylbenzene (boiling point 218° C.) and distillation is again resumed. The toluene having a lower boiling point (110.6° C.) will distill off at first. When the distilling point rises above the boiling point of toluene, the apparatus is changed to that shown in FIG. 3. Vacuum is applied and the triethyl-benzene is distilled off until the distilling flask contains a mass of crystals. These are then removed from the flask and are filtered with suction to remove the remaining triethyl-benzene. The crystals are dried in air.

The naphthenic acid salts of cadmium, gadolinium and samarium are made anhydrous by the first described method.

I have found that up to 10% cadmium 2-ethyl-hexanoate and 2-5% gadolinium or samarium 2-ethyl-hexanoate may be incorporated homogeneously in ordinary paraffin. Since "paraffin" is a name belonging to a class of compounds varying in melting point from about 38° C. to above 100° C., and whose dissolving property for the above compounds also will vary, the invention is not limited to the specific percentages herein stated as examples, and it is to be understood that the solubilities may be greater or less than herein stated. Further I have found that naphthenic and 2-ethyl-hexanoic acid salts of cadmium, gadolinium and samarium are soluble in vegetable waxes such as beeswax and that the latter may be substituted for paraffin.

I claim:
1. A composition for shielding components from neutron irradiation which comprises a wax-soluble organic salt of an element having a high neutron capture cross section, in solid solution in wax or a mixutre of waxes, said element being selected from the group consisting of anhydrous cadmium 2-ethyl-hexanoate, anhydrous gadolinium 2-ethyl-hexanoate and anhydrous samarium 2-ethyl hexanoate.

2. A composition for shielding components from neutron irradiation which comprises a wax-soluble organic salt of an element having a high neutron capture cross section, in solid solution in wax or a mixture of waxes, said wax-soluble organic salt of an element being selected from the group consisting of anhydrous naphthenic acid salts of cadmium, anhydrous naphthenic acid salts of gadolinium and anhydrous naphthenic acid salts of samarium.

3. A method of shielding components from neutron irradiation which comprises the steps of dissolving the wax-soluble organic salt of an element having a high neutron capture cross section in a melted wax or mixture of waxes which will remain as a solid solution in the wax upon cooling so that when the wax solidifies the neutron capturing salt will be distributed throughout the mass as a solid solution, and covering the components to be shielded with the resultant product, said wax-soluble organic salt of an element being selected from the group consisting of anhydrous cadmium 2-ethyl-hexanoate, anhydrous gadolinium 2-ethyl-hexanoate and anhydrous samarium 2-ethyl-hexanoate.

4. A method of shielding components from neutron irradiation which comprises the steps of dissolving the wax-soluble organic salt of an element having a high neutron capture cross section in a melted wax or mixture of waxes which will remain as a solid solution in the wax upon cooling so that when the wax solidifies the neutron capturing salt will be distributed throughout the mass as a solid solution, and covering the components to be shielded with the resultant product, said wax-soluble organic salt of an element being selected from the group consisting of anhydrous naphthenic acid salt of cadmium, anhydrous naphthenic acid salt of gadolinium and anhydrous naphthenic acid salt of samarium.

References Cited

UNITED STATES PATENTS

| | | | |
|---|---|---|---|
| 2,988,523 | 6/1961 | Erskine et al. | 252—478 |
| 3,148,160 | 9/1964 | Malm et al. | 252—478 |
| 3,166,431 | 1/1965 | Mullaly | 252—478 |
| 3,200,085 | 8/1965 | Guglielmo | 252—478 |

L. DEWAYNE RUTLEDGE, *Primary Examiner.*

BENJAMIN R. PADGETT, CARL D. QUARFORTH, *Examiners.*

S. J. LECHERT, Jr., *Assistant Examiner.*